United States Patent
Schoch

(10) Patent No.: US 6,481,295 B1
(45) Date of Patent: Nov. 19, 2002

(54) METHOD AND SYSTEM FOR MONITORING PEAK COMPRESSIVE AND TENSILE PROCESS SEVERITY LEVELS OF A PRESS MACHINE USING ACCELERATION DATA

(75) Inventor: Daniel A. Schoch, Minster, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/691,381

(22) Filed: Oct. 18, 2000

Related U.S. Application Data

(60) Provisional application No. 60/160,383, filed on Oct. 19, 1999.

(51) Int. Cl.$^7$ .............................................. G01L 5/16
(52) U.S. Cl. ...................................... 73/862.06; 73/511
(58) Field of Search .............................. 73/796, 862.06, 73/788, 511, 488

(56) References Cited

U.S. PATENT DOCUMENTS

| | | | |
|---|---|---|---|
| 2,924,698 A | | 2/1960 | Colten et al. |
| 3,169,394 A | | 2/1965 | Vosteen et al. |
| 3,190,121 A | | 6/1965 | Blasingame |
| 3,680,365 A | | 8/1972 | Summers |
| 4,208,895 A | * | 6/1980 | Grigorenko et al. ............. 72/8 |
| 4,429,627 A | | 2/1984 | Edsö |
| 4,461,182 A | | 7/1984 | Jones, Jr. et al. |
| 4,766,758 A | | 8/1988 | Lucas et al. |
| 4,914,602 A | * | 4/1990 | Abe et al. .................... 364/507 |
| 5,491,647 A | | 2/1996 | O'Brien et al. |
| 5,808,904 A | * | 9/1998 | Rasmussen et al. ......... 364/528 |
| 6,114,965 A | * | 9/2000 | Schoch ........................ 340/680 |
| 6,209,400 B1 | * | 4/2001 | Schoch et al. ................. 73/778 |

\* cited by examiner

*Primary Examiner*—Max Noori
(74) *Attorney, Agent, or Firm*—Randall J. Knuth

(57) ABSTRACT

A system for monitoring the operation of a press machine employs a sensor to measure the peak acceleration levels of a slide assembly. The sensor measurement data represents peak load levels being developed within the press machine. A data means provides load level capacity data representing the maximum allowable compressive and tensile load levels for the press machine. The capacity data is provided in the form of plural press machine operating zones each representing a corresponding range of load values and having a respective rating factor which indicates the relationship of the particular operating zone to a respective one of the maximum allowable compressive/tensile load levels. A processor evaluates the peak load levels in relation to the operating zone data to determine which respective ones of the plural press machine operating zones encompass each respective one of the peak load levels. The operating condition of the press machine is determined in accordance with the peak operating load levels and the respective rating factors associated with the respective press machine operating zones which are determined by the processor to encompass the peak load levels.

42 Claims, 6 Drawing Sheets

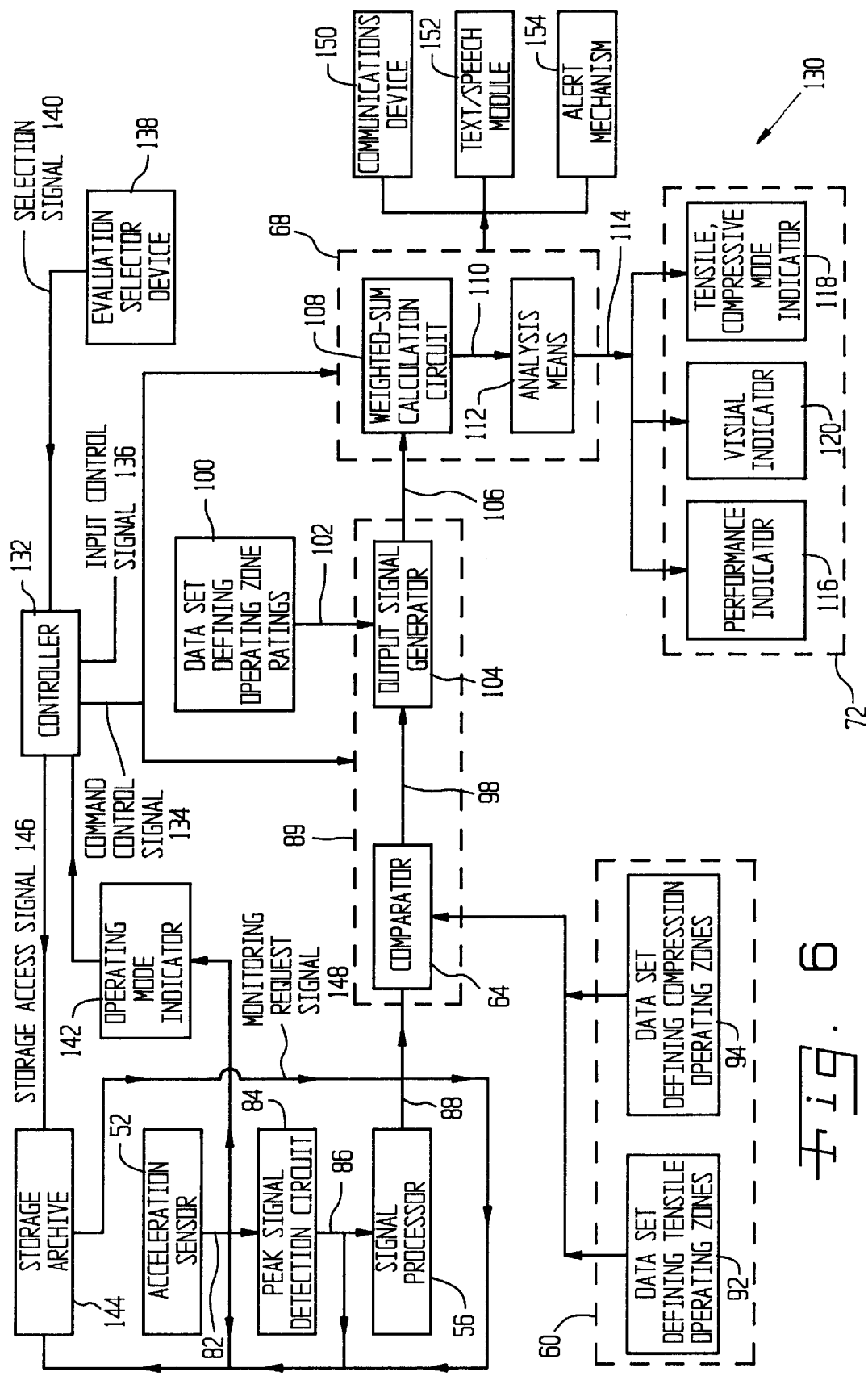

METHOD AND SYSTEM FOR MONITORING PEAK COMPRESSIVE AND TENSILE PROCESS SEVERITY LEVELS OF A PRESS MACHINE USING ACCELERATION DATA

This application claims te benefit of Provisional Application Ser. No. 60/160,383 filed Oct. 19, 1999.

BACKGROUND OF THE INVENTION

1. Field of the Invention

The present invention relates to a press machine monitoring facility, and, more particularly, to a method and system for dynamically monitoring the peak compressive and tensile acceleration activity occurring within a press machine to determine an operating condition based upon a comparison of the peak load values to machine-specific capacity levels.

2. Description of the Related Art

Monitoring the load levels within a press machine plays a vital role in properly evaluating the performance of the processing activity to ensure that machine components such as the slide assembly are being operated within acceptable tolerances. The rapid identification of an out-of-bounds operating condition allows corrective action to be immediately undertaken, such as terminating machine operation or adequately adjusting the slide movement. Otherwise, the continued operation of a press machine at above-threshold levels, coupled with the inability to accurately detect the occurrence of load levels that exceed the capacity ratings, may lead to a progressive degradation in the integrity of the workpiece and eventual breakdown of the machine components. Mechanical failures could include the complete shearing or fracturing of individual coupling links in the connection assembly or physical damage to fastening elements such as slide adjustment nuts and connection screws. Complete destruction of the press machine may result if the magnitude of the operating load level exceeds the capacity threshold by a sufficient amount or if the out-of-bounds condition is sustained for a sufficient period of time. Efforts to address this problem have led to the development of various types of monitoring apparatus designed to provide process supervision aimed at detecting when the compression-type forces exhibit load values that exceed predetermined threshold capacity levels.

One conventional approach employs measurement apparatus such as stress/strain gauges configured within the uprights of the press frame structure to measure the vibrational activity present within the machine. Apparatus of this type essentially operate by registering the magnitude of the vibrational energy content occurring over a given period of time such as a press production cycle. These sensors provide a measurement of the dimensional deformation or other such physical disturbances occurring in the press machine. Any changes measured by the strain gauge sensor with respect to the dimensional characteristics of the relevant machine part represent the force or load level that is being developed within the machine at the measurement location.

These sensing devices, however, utilize a form of time-averaging which makes them unsuitable for analyzing low-speed applications and detecting peak load level conditions. The measurement data generated by strain gauge sensors represents the change in vibrational energy content that takes place over a certain measuring interval. Thus, even if a peak load level occurs and is registered by the strain gauge sensor, this event may not be recognizable in the output vibrational energy data due to its summation with other comparatively lower vibrational energy measurements. What then happens, particularly during low-speed applications, is that the measured vibrational energy which corresponds to a peak load level becomes obscured or "smoothed-out" when combined or averaged with the predominantly low levels of vibrational energy content that appear during the rest of the press machine monitoring period. Consequently, although peak load values may occur that exceed the press machine capacity levels, the occurrence of such adverse operating conditions will remain undetected during those monitoring periods where the overall vibrational energy content is sufficiently low such that the generated measurement data indicates an average energy content well below the out-of-bounds level. This presents a particular problem in adequately evaluating low-speed applications that oftentimes include rapid changes in acceleration which typically occur over relatively short time durations, thereby producing a change in the vibrational energy content, that can easily be masked by comparatively lower levels of measured vibrational energy present during other time frames of the monitoring interval.

These conventional sensor devices also do not take into account the different evaluation requirements attending a tensile process and a compression process. Press machines are typically configured so that certain load-bearing components have a higher capacity rating in one direction than the other. For example, saddle bushings and ball bushings are typically designed to provide a level of load-bearing support in the compression direction that is comparatively higher than that provided in the tensile direction. With machines of this type that are designed primarily for compressive applications, the use of the press machine for a tensile application or for an application that requires sufficient tensile acceleration has the potential of creating an operating condition that will lead to parts failure and/or workpiece malformation. Sensor apparatus that rely upon measuring the change in vibrational energy content do not have a mechanism for distinguishing between whether the measurement data is attributable to a compressive-type application or a tensile-type application. The ability to differentiate between these two types of forces has particular importance in those press machines where the compressive and tensile capacity levels vary significantly, requiring a means to incorporate this difference into the evaluation strategy. For example, in a machine having a 200 ton compression capacity rating and a tensile rating representing 10% of the compression capacity, the maximum tensile load level is 20 tons. Current approaches do not provide a facility to distinguish between compression and tensile load level measurements, nor do they incorporate load level capacity data which accurately reflects the different capacity ratings depending upon the force direction, i.e., tensile or compression.

In view of the foregoing, there is a demonstrated need for a facility capable of dynamically identifying the occurrence of adverse operating conditions arising from a compressive and/or tensile force that currently exceeds or may eventually exceed the rated capacity of the press machine.

SUMMARY OF THE INVENTION

According to the present invention there is provided a method and system for evaluating the operating condition of a press machine based upon a comparison between load level capacity data and measurement data representing peak acceleration values of the slide assembly. A measuring device in the form of an accelerometer or other such transducer dynamically generates acceleration signals representing real-time measurements of the acceleration of the slide assembly. These acceleration signals are processed to identify which ones correspond to a peak acceleration condition for the slide assembly. The peak acceleration signals represent peak operating load levels being developed within the press machine. A data means in the form of a storage facility provides load level capacity data which represents the maximum allowable compressive and tensile load levels for the press machine under study. The capacity data is preferably provided in the form of a plurality of press machine operating zones each representing a corresponding range of load values and each having a respective rating factor associated therewith. The rating factor indicates the relationship of the particular press machine operating zone to a respective one of the maximum allowable compressive and tensile load levels. A processor evaluates the peak load levels in relation to the operating zone data to determine which respective ones of the plurality of press machine operating zones encompass each respective one of the peak load levels. The operating condition of the press machine is determined in accordance with the peak operating load levels (as represented by the corresponding measured peak acceleration values) and the respective rating factors associated with the respective press machine operating zones which are determined by the processor to encompass the peak load levels.

The invention, in one form thereof, comprises an assembly for use in monitoring the operation of a press machine, preferably in a dynamic manner throughout at least one press operating cycle. The monitoring assembly includes a data means for providing load level capacity data associated with the press machine. The load level capacity data preferably includes a representation of a maximum allowable compressive load level and/or a representation of a maximum allowable tensile load level. More particularly, the data means preferably includes a means for providing operating zone data defining a plurality of press machine operating zones each representing a corresponding range of load values. The monitoring assembly further includes a measurement means such as an accelerometer for providing a measure of the acceleration activity present within the press machine, wherein the acceleration activity measurement is representative of a load level measurement. An evaluation means compares the load level measurement with the load level capacity data and then provides an indication of an operating condition of the press machine based upon this comparison.

This indication of the operating condition of the press machine is preferably displayed in a visible or audible form via an annunciator panel which forms part of a display means. For example, an annunciator means may be provided, which is responsive to the occurrence of an out-of-bounds operating load level condition as indicated by the load level comparison result generated by the evaluation means, for providing an indication of the occurrence of the out-of-bounds operating load level condition.

The evaluation means, in one form thereof, further includes a processing means for evaluating the load level measurement in relation to the operating zone data to determine which ones of the plurality of press machine operating zones encompass the load level measurement. Each respective one of the press machine operating zones is provided with a respective rating factor which indicates the relationship of the respective one press machine operating zone to at least one of a threshold compressive load level and a threshold tensile load level. A means is provided for determining the operating condition of the press machine in accordance with the acceleration activity measurement provided by the measurement means and the respective rating factors associated with the respective press machine operating zones determined by the processing means to encompass the load level measurement represented by the acceleration activity measurement.

The measurement means, in one form thereof, includes a peak detector means for generating at least one peak acceleration signal each representing a respective peak load level developed within the press machine. Accordingly, the evaluation means, in another form thereof, further includes a processing means for evaluating the at least one peak load level generated by the peak detector means in relation to the operating zone data to determine which respective one of the plurality of press machine operating zones encompasses each respective one of the at least one peak load level. A means is provided to determine the operating condition of the press machine in accordance with at least the of the at least one peak acceleration signal and the respective press machine operating zone determined by the processing means to encompass the respective peak load level represented by the at least one of the at least one peak acceleration signal.

The evaluation means, in yet another form thereof, further comprises an analysis means, which is responsive to a plurality of acceleration values provided by the measurement means during a corresponding press cycle interval, for identifying ones of the plurality of acceleration values which satisfy a selectable signal characteristic criteria to thereby define a selected acceleration signal group. The analysis means compares the respective operating load level represented by each respective one of the selected acceleration signal group with the load level capacity data, and then provides an indication of an operating condition of the press machine in accordance with this comparison. This selectable signal characteristic criteria preferably represents a peak acceleration condition.

The monitoring assembly, in another form thereof, may optionally include a control means which is arranged to selectively activate the measurement means and the evaluation means only when the press machine designated for monitoring satisfies an authorization condition. This authorization condition is satisfied when the press machine designated for monitoring corresponds to at least one of an authorized press machine, an authorized family of press machines, and a press machine from an authorized manufacturer.

The monitoring assembly, in yet another form thereof, may optionally include a selection means responsive to a control signal for selectively activating the evaluation means in accordance with the control signal to thereby enable operation of the evaluation means during a selective one of press machine compression activity and press machine tensile activity. For this purpose, there is provided a means, responsive to the acceleration activity measurement provided by the measurement means, for determining whether the acceleration measurement corresponds to a one of compression activity and tensile activity and for generating a signal based upon this determination to control the selection means.

The monitoring assembly, in yet another form thereof, may optionally include a recordation means for recording the respective operating load level corresponding to each respective one of the plurality of acceleration measurements generated by the measurement means. A retrieval means controllably accesses and retrieves from the recordation means selectable ones of the recorded operating load levels corresponding to a selective one of press machine compression activity and press machine tensile activity. The selected ones of the recorded operating load levels are applied to the evaluation means for comparison with the load level capacity data to thereby generate a selected load level comparison result. This selected load level comparison result serves as the basis for providing an indication of the operating condition of the press machine.

The monitoring assembly, in still yet another form thereof, may optionally include a timer means for selectively activating at least one of the measurement means and the evaluation means to enable respective operation thereof over a selectable time period.

The invention, in yet another form thereof, comprises a system for use with a press machine. The monitoring system includes a data means for providing load level capacity data associated with the press machine. A sensor assembly dynamically measures the acceleration activity occurring within the press machine to thereby generate a plurality of acceleration signals representing a corresponding plurality of load level values. There is further provided a processor means, which is responsive to the plurality of acceleration signals generated by the sensor assembly, for determining an operating state of the press machine based at least in part upon a comparison between the load level capacity data and at least one of the plurality of load level values.

The processor means, in one form thereof, determines the operating state of the press machine by: (i) identifying ones of the plurality of acceleration signals each representing a respective peak acceleration condition to thereby define a peak acceleration signal group; (ii) comparing the corresponding load level value for each respective one of the peak acceleration signal group with the load level capacity data to thereby generate a peak level comparison result; and (iii) providing an indication of the operating state of the press machine in accordance with the peak level comparison result.

The data means, in one form thereof, further includes a means for defining a plurality of press machine operating zones each representing a corresponding range of load values. The processor means provides the indication of the operating state of the press machine in accordance with a determination of which respective one of the plurality of press machine operating zones encompasses each respective one of the peak acceleration signal group. The load level capacity data preferably includes a representation of a maximum allowable compressive load level and/or a representation of a maximum allowable tensile load level.

The invention, in yet another form thereof, comprises a system for use in monitoring the operation of a press machine. The monitoring system includes a data means for providing load level capacity data associated with the press machine. A measurement means provides a measure of the peak load levels developed within the press machine. An evaluation means determines an operating state of the press machine based at least in part upon a comparison between the peak load levels measurement provided by the measurement means and the load level capacity data.

The data means, in one form thereof, includes a means for defining a plurality of press machine operating zones each representing a corresponding range of load values. These operating zones are preferably defined in relation to at least one of a maximum allowable compressive load level and a maximum allowable tensile load level. The evaluation means determines the operating state of the press machine in accordance with a determination of which respective one of the plurality of press machine operating zones encompasses each respective one of the measured peak load levels provided by the measurement means.

The measurement means, in one form thereof, further includes a signal means provided in the form of an accelerometer for generating at least one peak acceleration signal each representing a respective peak load level developed within the press machine. These peak acceleration signals are then processed by the evaluation means to determine the particular operating zones that are associated with the peak load levels represented by the peak acceleration signals. The evaluation means generates an indication of the operating condition of the press machine based upon the peak load levels and the appropriate operating zones associated therewith.

The invention, in yet another form thereof, comprises a method of monitoring the operation of a press machine. The method includes the steps of providing a measure of the load level being developed within the press machine; providing capacity data indicating load level capacity values for the press machine; and evaluating the operation of the press machine by comparing the load level measurement with the capacity data.

The step of providing the load level measurement further comprises the step of generating a plurality of acceleration signals representative of the acceleration activity occurring within the press machine. The step of providing capacity data further comprises the step of defining a plurality of press machine operating zones each representing a corresponding range of load values. The plurality of press machine operating zones are preferably defined in relation to at least one of a maximum allowable compressive load level and a maximum allowable tensile load level.

The evaluation step further comprises the steps of (i) identifying which ones of the generated plurality of acceleration signals represent the occurrence of a respective peak acceleration condition to thereby define a peak acceleration signal group; (ii) determining which respective one of the plurality of press machine operating zones encompasses each respective one of the peak acceleration signal group; and (iii) determining an operating state for the press machine in accordance with the respective press machine operating zone determined to encompass each respective one of the peak acceleration signal group.

The invention, in yet another form thereof, comprises a method of monitoring the operation of a press machine. The method comprises the steps of providing a measure of the peak load levels developed within the press machine; providing capacity data indicating load level capacity values for the press machine; and evaluating the operation of the press machine by comparing the peak load levels measurement with the capacity data.

The step of providing a measure of the peak load levels further comprises the step of generating at least one peak acceleration signal each representing a respective peak load level within the press machine. The step of providing capacity data further comprises the step of defining a plurality of press machine operating zones each representing a corresponding range of load values. The plurality of press machine operating zones are preferably defined in relation to at least one of a maximum allowable compressive load level and a maximum allowable tensile load level.

The evaluation step further comprises the steps of (i) determining which respective one of the plurality of press machine operating zones encompasses each respective one of the at least one peak acceleration signal; and (ii) determining an operating state for the press machine in accordance with the respective press machine operating zone determined to encompass each respective one of the at least one peak acceleration signal.

One advantage of the present invention is that the monitoring system provides continuous, real-time readings of the compressive/tensile load conditions present during press machine operation to thereby enable dynamic monitoring of the severity level of the press operation.

Another advantage of the present invention is that the monitoring system enables accurate identification of the peak compressive/tensile load levels being developed within the press machine, which allows a comparison with the maximum permissible compressive/tensile load levels to determine whether the press machine is operating within acceptable margins.

A further advantage of the invention is that the evaluation strategy which is adopted for determining the operating condition of the press machine makes use of a rating system that weights each peak load level measurement based upon its comparative relationship to operating zone data which is represented by a plurality of press machine operating zones each defining a corresponding range of load values.

A further advantage of the invention is that the results of the comparative analysis between the load level capacity data and the peak acceleration measurement data is expressed in the form of a readily understandable performance indicator which represents the application severity level of the press machine operation, thereby providing the user with a means to quickly assess the operating state of the machine.

A further advantage of the invention is that the monitoring system is particularly well-suited to analyzing the load conditions developed during slow-speed applications due to the accuracy and reliability in determining the operating load levels, which is attributable to the use of acceleration measurements as the basis for evaluating the load levels.

A further advantage of the invention is that the monitoring system provides a means to evaluate the operating condition of the press machine which recognizes the type of acceleration activity taking place in the press machine (i.e., compressive or tensile) and which takes into account the different capacity levels for compression and tensile loading.

A further advantage of the invention is that the monitoring system is easily configurable as an integrated portable instrument or as a console mounted unit having various display features.

A further advantage of the invention is that the monitoring system is adaptable for use on a variety of press machines over a wide range of production processes.

A further advantage of the invention is that the monitoring system provides various optional features to enhance its utility and interfacing capabilities, such as a communications module to transmit data and other event-indicators over an internet connection, voice or sound announcers, lights, capacity-exceeding alarms, pager alerts, and text processing and signaling.

A yet further advantage of the invention is that the monitoring system includes a lock or latch mechanism to prohibit use of the apparatus on an unauthorized press, thereby promoting quality control and ensuring accurate evaluation results.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 6 is a detailed block diagram illustration of a system for monitoring the operation of a press machine in accordance with a third embodiment of the present invention.

Figure 1:
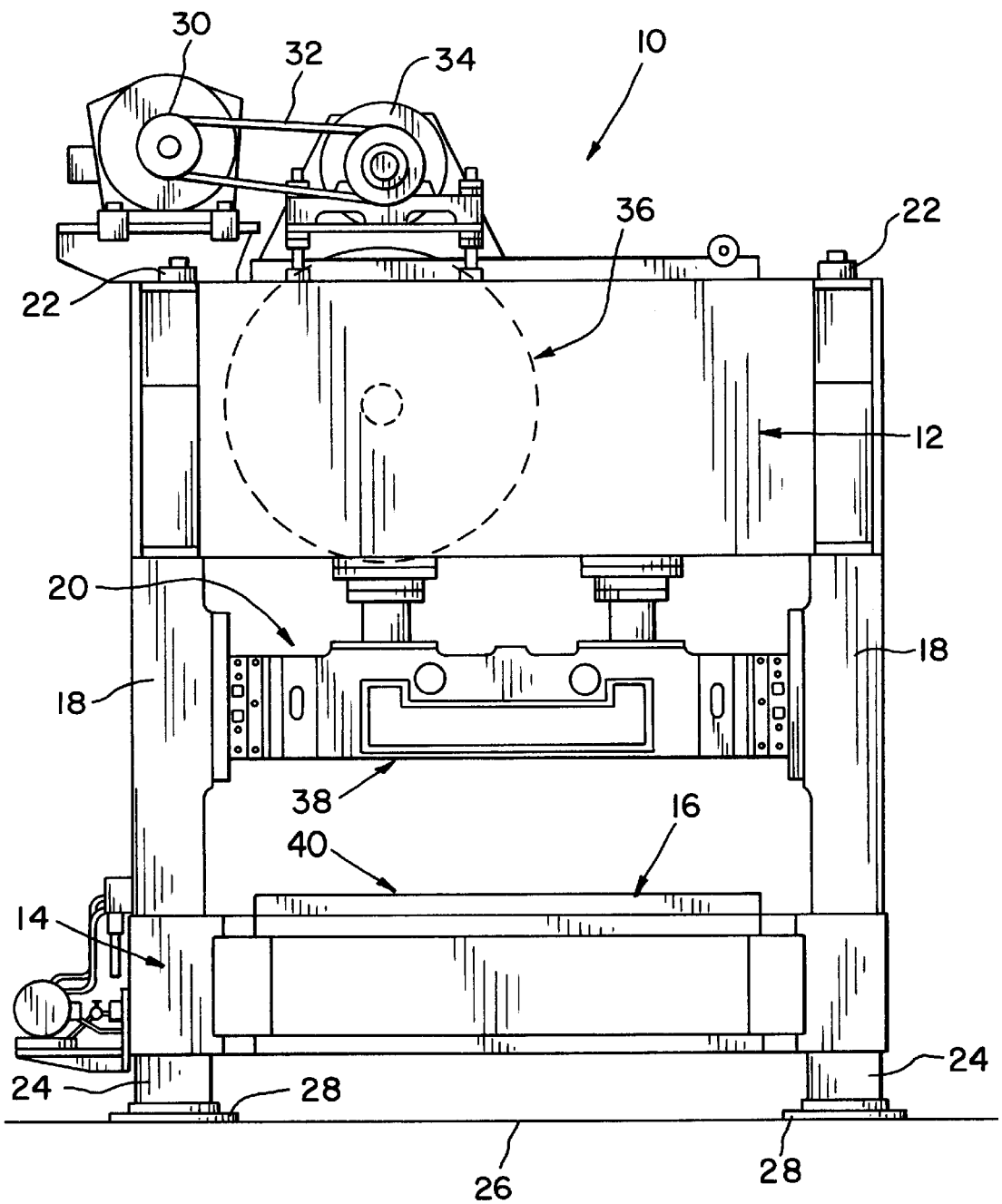
FIG. 1 is a front elevational view of one illustrative form of press machine used in conjunction with the monitoring system of the present invention.

Corresponding reference characters indicate corresponding parts throughout the several views. The exemplification set forth herein illustrates one preferred embodiment of the invention, in one form thereof, and such exemplification is not to be construed as limiting the scope of the invention in any manner.

DETAILED DESCRIPTION OF THE INVENTION

The monitoring system as shown and described herein according to the present invention may be used in conjunction with a variety of machines of the mechanical press type. Accordingly, reference is first made to FIG. 1 in which there is shown a mechanical press 10 of conventional form including a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 20 is positioned between uprights 18 for controlled reciprocating movement between crown 12 and bed 14. Tie rods (not shown) extending through crown 12, uprights 18 and bed portion 14 are attached at each end with tie rod nuts 22. Leg members 24 are formed as an extension of bed 14 and are generally mounted on shop floor 26 by means of shock absorbing pads 28. A drive press motor 30, which is part of the drive mechanism, is attached by means of a belt 32 to an auxiliary flywheel 34 attached to crown 12. Auxiliary flywheel 34 is connected by means of a belt (not shown) to the main flywheel of the combination clutch/brake assembly, depicted generally at 36. This form of the press machine is described for illustrative purposes only as it should be apparent to those skilled in the art that the principles of the present invention may be practiced with and incorporated into other machine configurations. Press machine 10, when fully configured with a die assembly installed therein, further includes an upper die (not shown) generally located at area 38 and attached by known means in a conventional manner to the lower end of slide 20. A lower die (not shown) located generally at area 40 is attached by known means in a conventional manner to the upper end of bolster 16. The upper and lower dies, as so arranged in their opposing spaced-apart relationship, cooperate in a known manner during press operation to process a workpiece disposed therebetween, e.g., fastened to the lower die. The upper and lower dies together constitute a die set or assembly.

Figure 2:
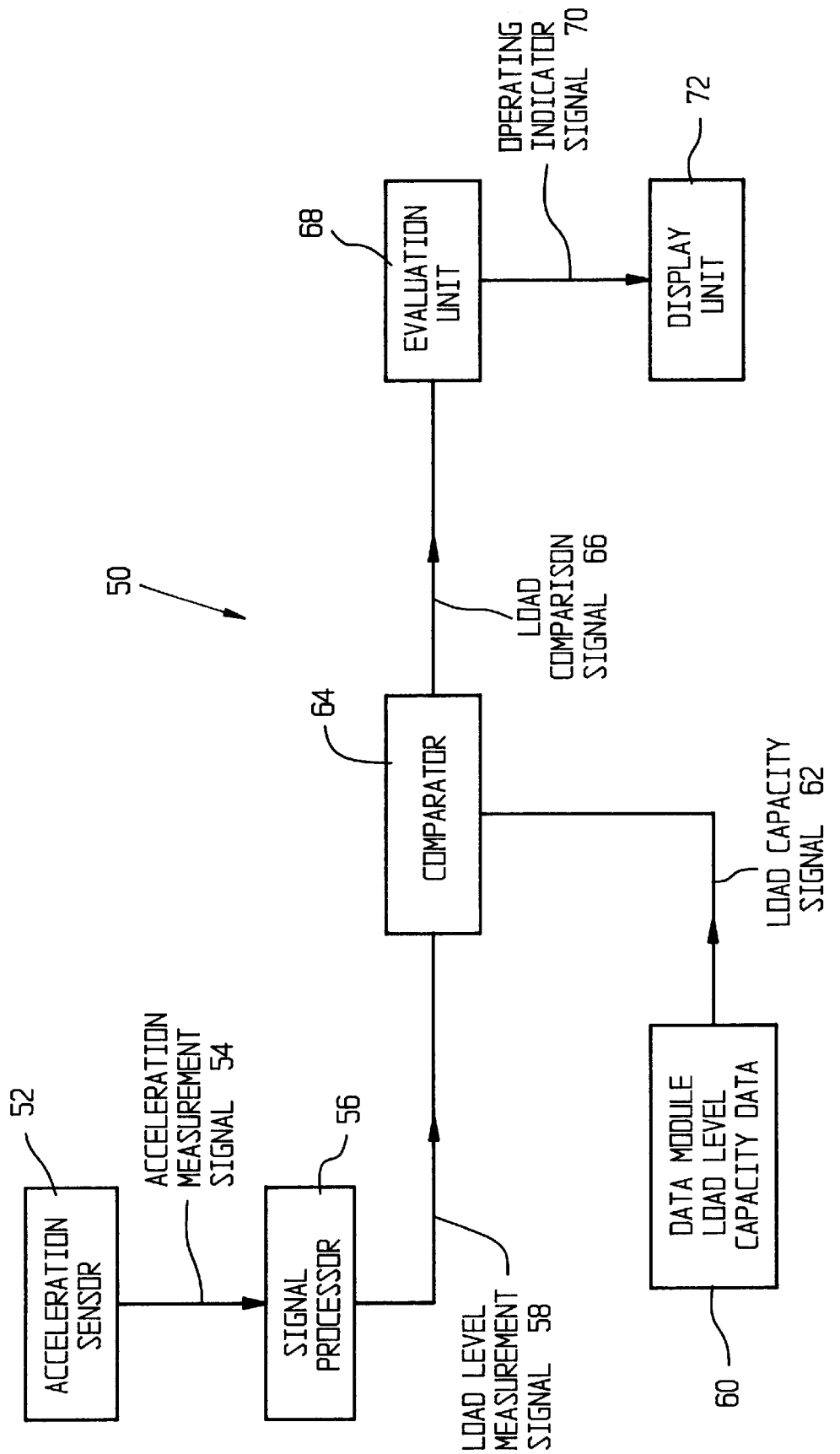
FIG. 2 is a block diagram illustration of a system for monitoring the operation of a press machine in accordance with a first embodiment of the present invention.

Referring now to the drawings and particularly to FIG. 2, there is shown in block diagram format a monitoring system 50 for use in monitoring the operation of a press machine of the type shown in FIG. 1, in accordance with a first embodiment of the present invention. The illustrated monitoring system 50 includes a motion measurement apparatus provided in the form of an acceleration sensor 52 which is arranged to measure the acceleration of the press machine slide assembly and to generate an acceleration measurement signal 54 representative thereof. A signal processor 56 processes the acceleration measurement signal 54 generated by sensor 52 and converts it into a corresponding load level measurement signal 58, which is representative of the force or load developed within the press machine. A data module 60 provides information in the form of a load capacity signal 62 which is representative of the load capacity thresholds for the press machine under study, namely the maximum allowable tensile load level and the maximum allowable compressive load level.

Sensor 52 should be understood as being representative of any apparatus which is suitable for measuring the acceleration of the slide assembly, such as an accelerometer, transducer, or other such measurement device. Furthermore, sensor 52 may be provided in a form capable of supporting a variety of operating modes. For example, sensor 52 may be selectively or controllably operated to provide measurements at defined intervals (i.e., a variable measurement rate), provide measurements in a dynamic manner so as to generate a continuous stream of real-time acceleration values, and/or provide measurements which when applied to a peak signal detection circuit enable the identification of peak acceleration levels occurring within the press machine. Furthermore, sensor 52 enables acceleration measurements to be obtained with respect to both tensile processing activity and compressive processing activity. Accordingly, the acceleration measurements generated by sensor 52 provide a complete and accurate characterization of the load level activity that is being developed within the press machine in regard to both types of processing activity, namely tensile and compression.

The monitoring system 50 further includes a comparator 64 of conventional design which receives as inputs the load level measurement signal 58 generated by signal processor 56 and the load capacity signal 62 generated by data module 60. Comparator 64 performs a comparison operation in which the measured press machine operating load level (represented by load level measurement signal 58) is compared with the load level capacity values (represented by load capacity signal 62) to determine the relationship of the measured operating load level to the relevant one of the maximum allowable tensile load level and the maximum allowable compressive load level. For this purpose, the load level measurement signal 58 preferably includes or is associated with an operating mode indicator that signifies the type of processing activity (i.e., tensile or compressive) corresponding to the load level measurement.

The comparison function performed by comparator 64, in one form thereof, makes a determination of whether the load capacity level of the press machine has been exceeded by the measured operating load level developed within the press machine. Comparator 64 generates a load comparison signal 66 representative of the results of this load level comparison operation. For example, the load comparison signal 66 may include a representation of the proportional relationship between the measured operating load level and the load capacity level or may simply indicate that the measured load level is within tolerances or has exceeded the threshold. Monitoring system 50 further includes an evaluation unit 68 which evaluates the load level comparison results represented by load comparison signal 66 and provides an indication of the operating condition of the press machine in response to and as a function of the load comparison results. This indication of the operating condition is provided by evaluation unit 68 in the form of an operating indicator signal 70. A display unit 72 generates, for example, a visual or text-based representation of the operating condition of the press machine in response to and in accordance with the operating indicator signal 70 generated by evaluation unit 68.

The illustrated monitoring system 50 of FIG. 2 therefore provides a facility to reliably and accurately measure and evaluate the load levels being developed within the press machine. In particular, the acceleration measurements generated by sensor 52 enable a real-time dynamic analysis to be performed of the operating condition of the press machine. Monitoring system 50 is preferably configured as a modular assembly in which the illustrated devices are integrated into a portable instrument apparatus, allowing the monitoring arrangement to be used in conjunction with any of a variety of press machines installed at various locations. For this purpose, monitoring system 50 is provided with a facility to obtain the appropriate information relating to the target press machine intended for study. For example, signal processor 56 may be arranged to receive machine configuration data appropriate to the current slide assembly to enable a proper computation of the load level. Additionally, data module 60 may be updated, modified, or otherwise processed to include the relevant load level capacity data for the current press machine. This machine-specific data, for example, could be delivered as a manual input, via electronic means, or via electro-mechanical means such as a bar code reader affixed to the machine.

Referring again to acceleration sensor 52 and signal processor 56, it is important to examine the physical activity that is being measured by these devices and subsequently evaluated by monitoring system 50, particularly in relation to the machine conditions which give rise to out-of-bounds load levels. As noted above, the measured acceleration value is representative of the load level being developed within the press machine due to the accelerating motion of the slide assembly. Recalling the fundamental force relationship of $F = m \times a$ (where "F", "m" and "a" represent force, mass, and acceleration, respectively), the measured acceleration can be understood in force terms as the force being applied per unit mass within the press machine.

The range of permissible load levels for the press machine is limited by threshold values commonly defined in terms of the "press tonnage capacity." Accordingly, for purposes of comparison with the measured operating load levels, it is necessary to provide capacity data that is characteristic of the particular press machine in use and which indicates the maximum allowable compressive and tensile load levels that can be developed within the press machine. This data is commonly furnished by the press manufacturer. For purposes herein, this capacity data, regardless of the point of origin, is supplied by data module 60. As noted above, before the measured load level is evaluated, it is first necessary to determine whether the measured acceleration value corresponds to the compressive or tensile phase of the press cycle, since the load level capacities are different for each phase. After completing this phase determination, the operating load level defined by its respective measured acceleration value is compared to the press machine capacity data to determine an operating state of the press machine.

It is appropriate for an understanding of the analysis performed by monitoring system 50 to review the force and acceleration conditions that exist at the threshold levels corresponding to the maximum allowable tensile and compressive load values. For purposes of discussion and not in limitation thereof, the parameters affecting the tensile phase threshold levels, will be examined, although it should be understood that a similar description applies to the compression phase. As noted herein, one advantage of the present invention concerns its ability to detect in a highly discriminatory manner the slight and/or rapid velocity changes that accompany low-speed die applications, a feature which distinguishes favorably over conventional vibration-sensing apparatus that typically cannot provide a similar low-speed detection capability due to their reliance upon vibrational energy content to signify the occurrence of adverse events, i.e., excessive acceleration. This sensitivity to changes in velocity is particularly important when the die application involves a tensile phase because the maximum allowable tensile load is typically much lower than the compressive capacity, therefore making the tensile phase potentially more vulnerable to overloading. The dynamic generation and processing of acceleration measurement data by monitoring system 50 enables a real-time evaluation of the press machine operating condition such that undesirable trends or progressions in the operating load level can be readily identified.

Referring now to the development of an analytical formulation or characteristic definition of the tensile load activity, the peak dynamic tensile load ($F_T$) is created by the maximum acceleration ($a_{ACT}$) of the slide, which may be developed by press conditions such as high-speed press motion in the tensile direction, process snap thru, or other tensile effects. This tensile load is expressed as $F_T = m \times a_{ACT}$ or, since $m = W_T/g_{GRAVITY}$ (wherein $g_{GRAVITY}$ is the normal acceleration due to gravity), $F_T = (W_T/g_{GRAVITY}) \times a_{ACT}$ The parameter $W_T$ is a constant specific to the machine and corresponds to the weight of the slide assembly components (e.g., the combination of the upper die, slide, and connection assembly) that are being accelerated to the peak actual tensile acceleration $a_{ACT}$. Accordingly, another expression of tensile load is:

$F_T = W_T \times (a_{ACT}/g_{GRAVITY})$ wherein $a_{ACT}/g_{GRAVITY}$ equals $G_{MAX-TENSILE}$, thereby indicating a maximum allowable condition. The G parameter generally refers to an acceleration value corresponding to the level of the actual measured acceleration relative to the acceleration due to gravity.

The maximum allowable tensile load is then expressed as:

$F_{T(MAX)} = W_T \times G_{MAX-TENSILE}$.

Therefore, if the press tensile capacity is 15% of the press compressive capacity (or the industry definition of rated "Press Tonnage Capacity"), for example, then:

$F_{T(MAX)} = 0.15 \times$"Press Tonnage Capacity" (tons)$\times 2000$ lbf./ton.

It follows then that the maximum acceptable $G_{TENSILE}$ level is $G_{MAX-TENSILE} = (F_{T(MAX)}/W_T) = (0.15 \times \text{capacity} \times 2000)/W_T$.

This expression describing the upper limit on the G parameter provides a formula for ascertaining the upper limit on the acceleration of the slide assembly, namely by multiplying the G parameter with the acceleration due to gravity. This expression of maximum allowable acceleration and the associated load level it defines are employed as press data capacity values used by monitoring system 50 to evaluate the status of the press operation and, in particular, the acceptability of the measured acceleration and the corresponding operating load level. Accordingly, signal processor 56 may perform its conversion or translation of acceleration measurement signal 54 pursuant to any one of the formulations described hereinabove to thereby provide alternative representations of the measured acceleration value, in accordance with one aspect of the present invention. For example, the measured acceleration value may be converted into a G-parameter expression (i.e., G equals the measured acceleration divided by the acceleration due to gravity) or a load value $F_{LOAD}$ determined in accordance with one of the force equations. The value $F_{LOAD}$ corresponds to the load (i.e., force applied per unit mass) that is developed within the press machine due to the accelerating motion of the slide assembly. Comparator 64 then retrieves from data module 60 the appropriate comparison data (i.e., capacity level G-values or load values) depending upon the particular form of load level measurement signal 58 which is generated by signal processor 56 (i.e., G-parameter or load value $F_{LOAD}$). For this purpose, data module 60 is constructed to be able to provide each type of load level representation.

What has been shown and described herein by FIG. 2 is a monitoring system having broad application with respect to measuring and evaluating the complete load level activity occurring within a press machine. As the foregoing analysis indicates, this monitoring function acquires its most useful and important application in regard to measuring and evaluating the peak acceleration values and the corresponding peak load levels that are present within the press machine. Accordingly, pursuant to another embodiment of the present invention discussed below in conjunction with FIGS. 3 and 4, this foregoing analysis pertaining to the peak load conditions is applied to the principles of the present invention embodied in monitoring system 50 (FIG. 2) in order to implement another form of monitoring system. More particularly, this monitoring system will determine the peak load levels based upon peak acceleration measurements and then evaluate these peak load levels according to their relationship to predefined press machine operating zones, each of which represents a respective subrange of load values preferably expressed in terms of a percentage of press tonnage capacity.

Figure 3:
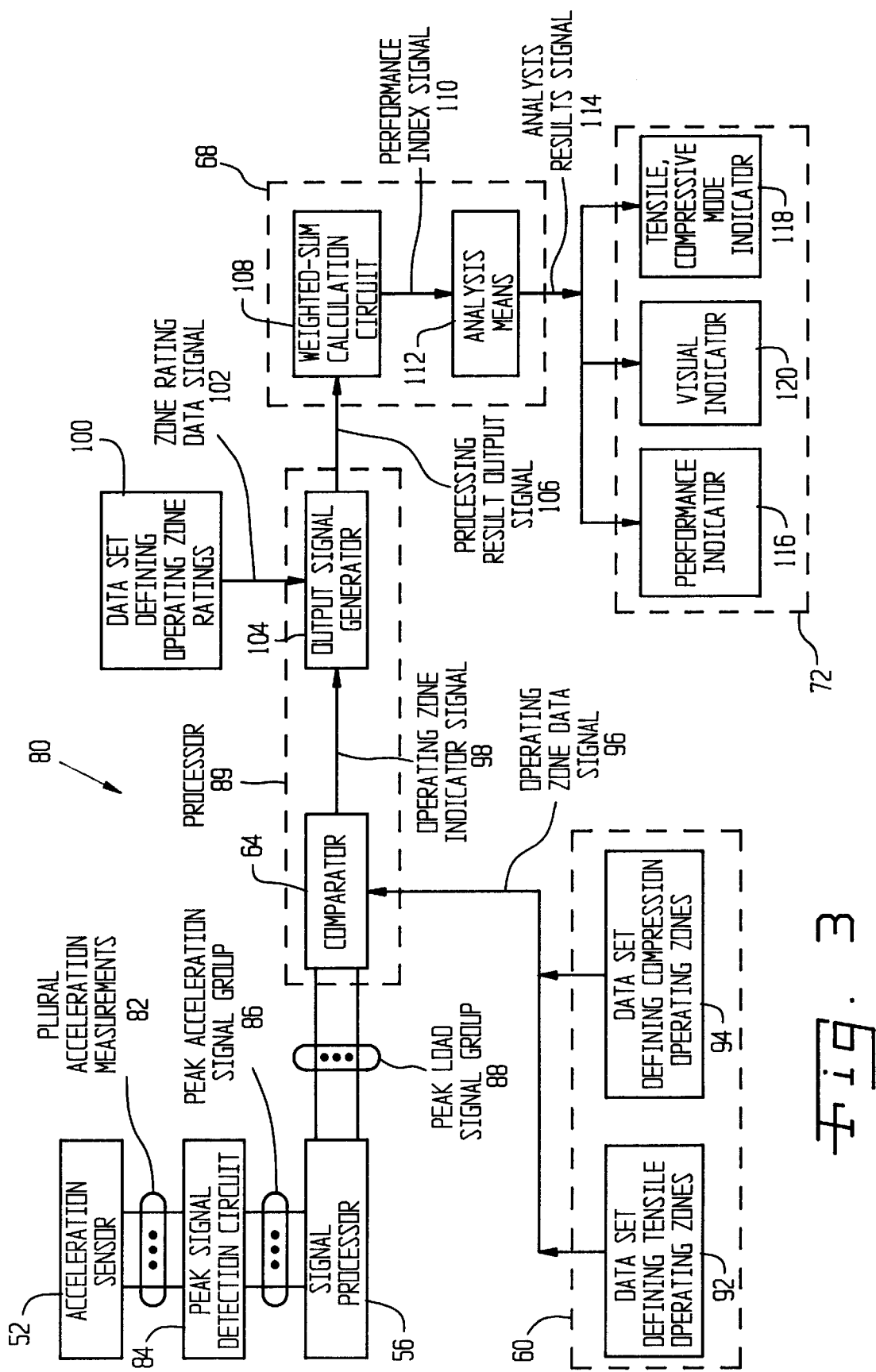
FIG. 3 is a block diagram illustration of a system for monitoring the operation of a press machine in accordance with a second embodiment of the present invention.

Referring now to FIG. 3, there is illustratively shown a press machine monitoring system 80 developed in accordance with a second embodiment of the present invention. For purposes of illustration, the description set forth herein regarding FIG. 3 relates to monitoring the performance of the press machine during a representative press production cycle which is illustratively depicted in FIG. 4. The load level evaluation strategy adopted by monitoring system 80 is aimed at identifying the peak load level conditions present within the press machine and then analyzing these peak load levels in relation to compressive/tensile capacity data that is provided in the form of discrete load level operating zones each representing a respective subrange of load values. The discussion of FIG. 3 is facilitated with reference to FIG. 4, which depicts in graphical form the variation in operating load level as a function of time over one full press cycle and into part of a subsequent press cycle. It should be understood that the various monitoring systems disclosed herein can be employed to monitor any number of machine strokes and/or to monitor press operations occurring over any time frame, such as multiple press production cycles taking place in sequence or at any other defined interval. The information which appears in the FIG. 4 graph is obtainable by operation of monitoring system 80, as discussed hereinbelow.

Figure 4:
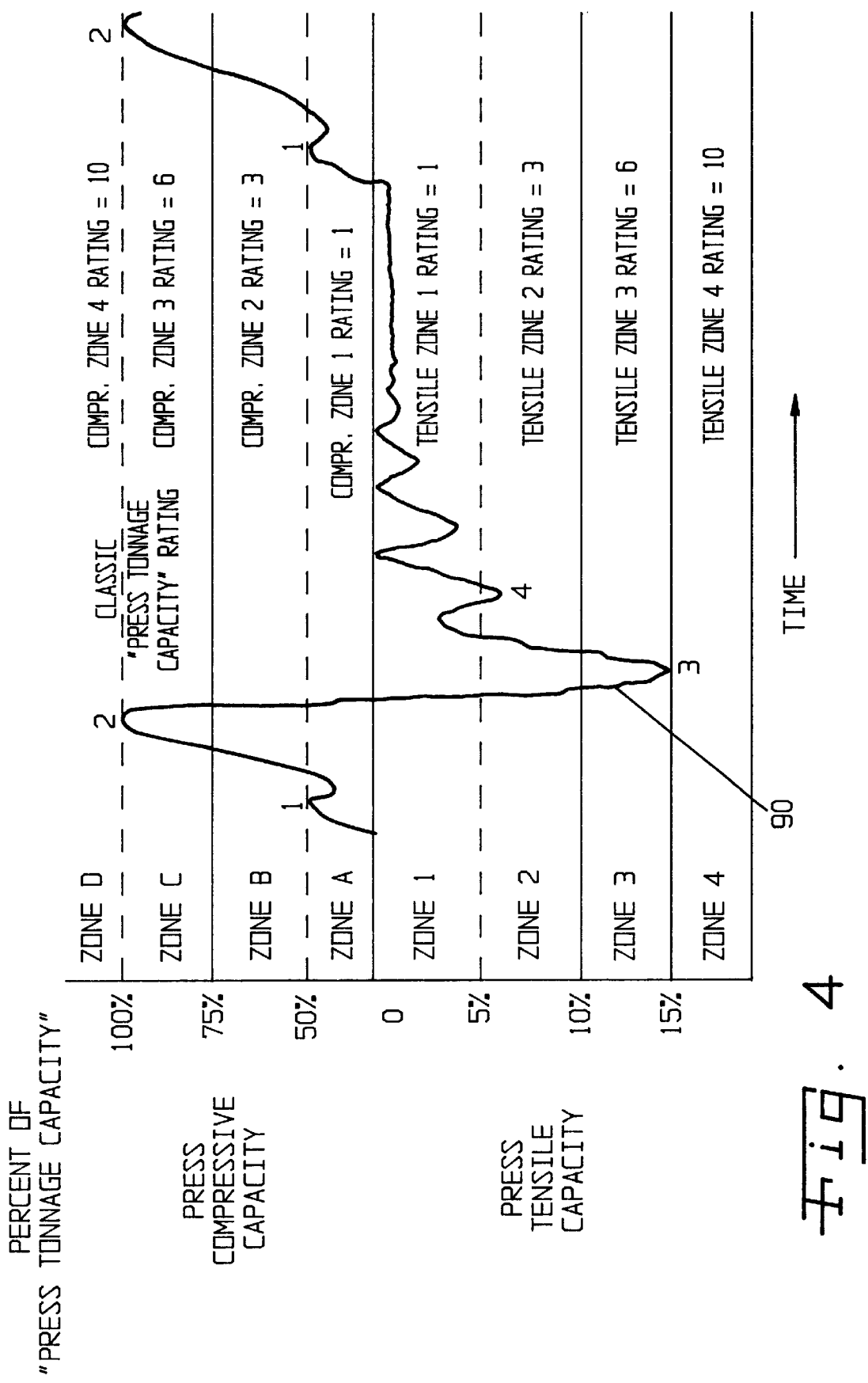
FIG. 4 is a graph plotting load level measurements versus load level capacity data arranged in the form of plural operating zones to representatively illustrate the evaluation strategy employed by the monitoring system of FIG. 3, in which the production severity level of a die application is determined based upon the rating factor which is associated with the operating zone that encompasses each peak load level.

Referring first to FIG. 4 in more particular detail, the illustrated graph includes an upper section and a lower section each divided into various zones or ranges of load values associated with a compressive phase and a tensile phase, respectively. As shown, the compressive region is partitioned into discrete non-overlapping operating Zones A–D each representing a corresponding range of load values. Likewise, the tensile region is partitioned into discrete operating Zones 1–4. The range of load values for each operating zone is defined in terms of a percentage of. "Press Tonnage Capacity." For example, with respect to the compressive graph region, Zones A–D correspond respectively to the following range of load values expressed as a percentage of "Press Tonnage Capacity": 1–50%, 50–75%, 75–100%, and above 100%. Likewise, with respect to the tensile graph region, Zones 1–4 correspond respectively to the following range of load values expressed as a percentage of "Press Tonnage Capacity": 0–5%, 5–10%, 10–15%, and above 15%. In this illustration, it is clear that the threshold tensile load level is much lower than the threshold compressive load level, i.e., 15% versus 100% of "Press Tonnage Capacity." It should be understood that the indicated load range values and other aspects of the operating zone formulations depicted in FIG. 4 should not be considered in limitation of the present invention since various other zoning schemes can be similarly constructed and used. The operating zones, by virtue of being defined in relation to the "Press Tonnage Capacity" of the machine, provide a ready means by which to determine the "closeness" or proximal relationship of each measured operating load level to the threshold load value, i.e., maximum permissible compressive/tensile load level.

Referring still to FIG. 4, in accordance with another aspect of the present invention, there is provided for each operating zone an associated rating factor that signifies the degree of severity involved with having the measured load level being located within or encompassed by the relevant operating zone. A higher rating, for example, indicates a more severe operating condition because of the greater closeness of the associated operating zone to the threshold capacity level, as compared to a lower-rated operating zone. It is one object of monitoring system 80 illustrated in FIG. 3 to identify the appropriate press machine operating zones which are associated with the peak load levels occurring within the press machine and to formulate a performance rating of the press machine based upon these peak load levels and their associated operating zone identifications (i.e., zone ratings).

Returning now to a discussion of FIG. 3, the illustrated monitoring system 80 is preferably arranged to dynamically measure and evaluate the acceleration activity occurring within the press machine over a desired time interval, such as a press production cycle. Acceleration sensor 52 generates a plurality of acceleration measurements 82 representing the acceleration activity of the press machine slide assembly. A peak signal detection circuit 84 of conventional design processes the acceleration measurements 82 generated by sensor 52 and identifies the particular acceleration measurements which correspond to a peak acceleration condition occurring within the press machine. More specifically, the peak signal detection circuit 84 provides at its output a group of peak acceleration signals 86 that are representative of these identified peak acceleration measurements. Signal processor 56 is responsive to the peak acceleration signal group 86 and converts each peak acceleration signal into a corresponding peak load signal, which are collectively indicated by peak load signal group 88 provided at the output of signal processor 56. Monitoring system 80 further includes a processor 89 which functions to determine the relationship of each peak load measurement (as represented in peak load signal group 88) to the appropriate one of the threshold compressive load level and the threshold tensile load level. These threshold levels are preferably defined in terms of press machine operating zones having load value ranges expressed as a percent of "Press Tonnage Capacity", such as illustrated by FIG. 4.

For purposes of illustration herein, the plural acceleration measurements 82 generated by sensor 52 are considered to represent the operating load level activity which is indicated by load level curve 90 plotted as a function of time in FIG. 4. The relative maxima of curve 90 are indicated by points 1–4, which in FIG. 3 are represented by peak load signal group 88 derived from peak acceleration signal group 86. As shown, the load maxima at points 1 and 2 occur within the compressive phase of the production cycle, while the load maxima at points 3 and 4 occur within: the tensile phase of the production cycle.

As noted above, the evaluation strategy implemented by monitoring system 80 involves comparing the peak load level measurements with load level capacity data provided in the form of press machine operating zones such as those illustrated in FIG. 4. Accordingly, for this purpose, data module 60 preferably includes a first data set 92 having data which defines the tensile operating zones ("tensile zone data set") and a second data set 94 having data which defines the compression operating zones ("compression zone data set"). Data elements from either or both of tensile zone data set 92 and compression zone data set 94 are represented in operating zone data signal 96 generated by data module 60.

Comparator 64 of processor 89 performs a comparison between the measured peak load levels (represented by peak load signal group 88) and the load level capacity data for the tensile and compressive phases (represented by operating zone data signal 96). More particularly, for each respective one of the peak load values represented in peak load signal group 88, comparator 64 determines which respective one of the as-defined press machine operating zones encompasses the peak load value. In regard to the load level maxima illustrated in FIG. 4, comparator 64 would ascertain that load level values 1–4 are encompassed respectively by Zones A/B, Zones C/D, Zones 3/4, and Zone 2. This identification of the corresponding press operating zones represents at least in part the results of the comparison operation; accordingly, the operating zone indicator signal 98 generated by comparator 64 in response to and in accordance with the comparison operation will preferably include a representation of these identified press operating zones. The operating zone indicator signal 98, in one form thereof, will preferably be expressed in a form which identifies or associates each of the peak load measurements (represented by peak load signal group 88) with its corresponding press operating zone as determined by comparator 64.

As indicated above, each of the press machine operating zones is assigned a rating factor such as those shown in conjunction with Zones A–D and Zones 1–4 of FIG. 4. For this purpose, there is provided in conjunction with processor 89 a third data set 100 having data which defines the selected rating system for the corresponding arrangement of press operating zones ("zone rating data set"). Data elements from zone rating data set 100 are represented in zone rating data signal 102 generated therefrom. The illustrated processor 89 further includes an output signal generator 104 that is coupled to receive operating zone indicator signal 98 from comparator 64 and zone rating data signal 102 from zone rating data set 100. The output signal generator 104 functions to correlate or associate the appropriate zone rating factor (as represented in zone rating data signal 102) with each respective one of the identified press machine operating zones (as represented in operating zone indicator signal 98) which was determined by comparator 64 to encompass each respective peak load level measurement represented in peak load signal group 88. The processing result output signal 106 produced by output signal generator 104 therefore preferably incorporates, in composite form, a representation of the following elements: (i) the peak load level values represented in peak load signal group 88; and (ii) the respective press machine operating zones and their associated rating factors corresponding to each of the peak load level values. As discussed below, the information contained in processing result output signal 106 is forwarded to evaluation unit 68 for final analysis and then delivered to display unit 72 for presentation of the evaluation results.

The illustrated evaluation unit 68 examines the results of the comparison operation performed by processor 89 (which is represented in processing result output signal 106) and develops a measure of the performance of the press machine based upon this examination. More particularly, in accordance with another aspect of the present invention, a weighted-sum calculation circuit 108 performs a weighted-sum operation involving each peak load level value and its associated rating factor, which is obtained from the processing result output signal 106 produced by output signal generator 104 of processor 89. The rating factor serves to scale or weight its corresponding peak load level value prior to being combined with other similarly-scaled peak load level values.

The result obtained from this weighted-sum operation provides an accurate measure of the overall production severity level of the die application because it takes into account each one of the particular acceleration conditions (i.e., peak acceleration values) which determine the acceptability of the press machine operating condition relative to capacity threshold levels. Additionally, the weighted-sum operation permits the relative significance or severity of each peak acceleration measurement to be accounted for by employing the zone-specific rating system. The acceleration conditions being investigated correspond generally to the various singular or multiple peak tensile G levels and the singular or multiple peak compressive G levels, as modified (i.e., scaled) according to their relative importance or significance as indicated by their respective tensile or compressive zone ratings. The outcome from this computation performed by weighted-sum calculation circuit 108 is provided in the form of a performance index signal 110 which represents a performance index useful in measuring the production severity level of the press machine and especially in making an index-based comparison with the production severity level of other press production cycles. An analysis means 112 receives the performance index signal 110 generated by weighted-sum calculation circuit 108 and performs, in accordance with one aspect thereof, an interpretive evaluation of the information represented therein to essentially render a judgment as to the acceptability of the operating condition of the press machine. This judgment essentially constitutes a decision regarding the significance of the relationship between the measured peak acceleration values and the press machine operating zones.

Figure 5:
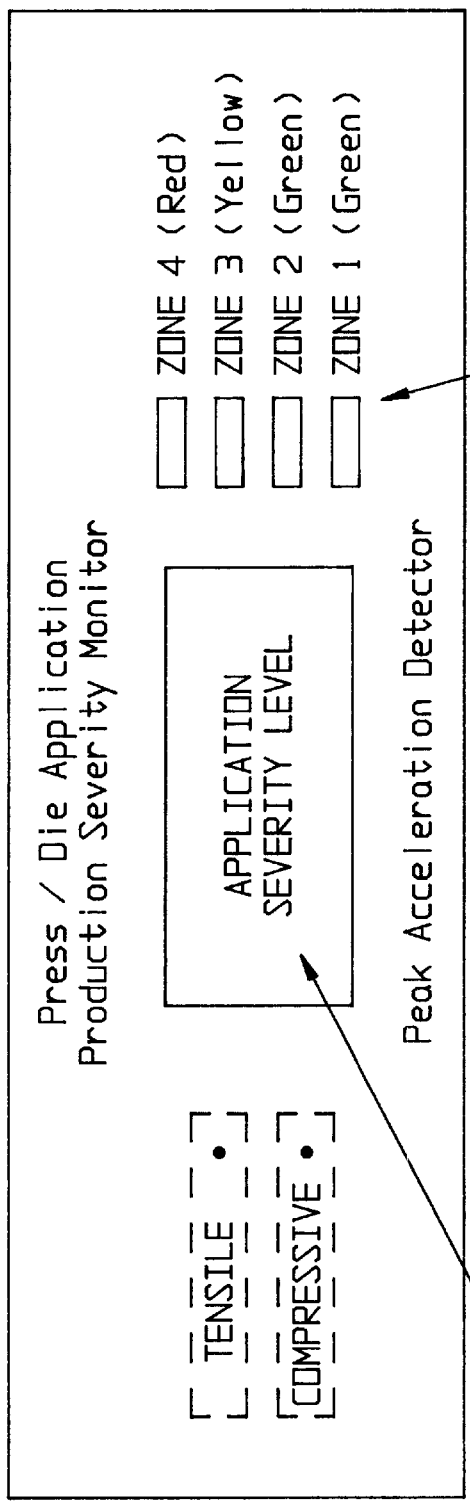
FIG. 5 is a schematic illustration of a display module for use in conjunction with the monitoring system of FIG. 3.

Analysis means 112 generates an analysis results signal 114 in response to and in accordance with its interpretive evaluation of the information represented by performance index signal 110. The analysis results signal 114, for example, may include representations of the following information: (i) a numerical measure of the application severity level, such as a composite weighted-sum calculation based upon the respective G-parameter and press machine operating zone for each measured peak acceleration value; (ii) an indication of whether the application severity level index relates to an evaluation of either the tensile or compressive phase or both; and (iii) a video signal representing the application severity level. The illustrated monitoring system 80 preferably includes a display unit 72 having a performance indicator 116, a tensile/compressive mode indicator 118, and a visual indicator 120 such as a color-coded LED display panel for respectively displaying the information indicated above that is contained within analysis results signal 114. This group of indicators 116, 118, and 120 may be integrally provided in the form of an annunciator panel 115 such as that shown in FIG. 5.

It should be understood that the use of peak load level measurement data by the press machine evaluation strategy disclosed herein is provided for illustrative purposes only and should not be considered in limitation of the present invention. Rather, the slide assembly acceleration measurements which serve as the basis for comparison with the load level capacity data may be provided in any of various alternative forms, such as in the form of a G-parameter expression, a pure acceleration value, or as a peak load level value, which itself is derived from the acceleration measurements pursuant to the formulations presented hereinabove. For this purpose, the capacity data can be preferably provided in the form appropriate to the manner in which the measurement data is presented for evaluation, namely as $G_{MAX-TENSILE}$, maximum allowable $a_{ACT}$, or $F_{T(MAX)}$.

Referring now to FIG. 6, there is shown in block diagram format a press machine monitoring system 130 developed in accordance with a third embodiment of the present invention which incorporates various additional features and enhancements to monitoring system 80 disclosed in FIG. 3. As will be described more fully below, monitoring system 130 is provided with a controller 132 to perform a variety of control functions, such as implementing a locking capability to limit the monitoring activity to authorized press machines, implementing a timer mechanism to selectively choose the time period for conducting monitoring activity, and implementing a selection mechanism to enable user selection of the type of activity to be monitored (e.g., compressive or tensile phase monitoring). The illustrated monitoring system 130 also includes an archival mechanism provided in conjunction with the selection mechanism to enable selective monitoring of historical acceleration data (i.e., previously measured and recorded acceleration values), and further includes an enhanced information delivery mechanism to facilitate wider distribution of and access to the results of the monitoring activity.

Referring more particularly to FIG. 6, controller 132 operates in accordance with one mode thereof to generate a command control signal 134 responsive to input control signal 136 for effectuating operational control of at least one of processor 89 and evaluation unit 68, according to another aspect of the present invention. This control feature enables monitoring system 130 to be selectively enabled or disabled in accordance with user-provided or externally-supplied operational control data delivered to controller 132 via input control signal 136. For example, when it is desired to conduct the monitoring activity only with a specific press, a specific family of presses, and/or specific presses from a particular manufacturer, this requirement can be suitably represented in input control signal 136. Controller 132 would then determine if the current press machine is authorized for use with monitoring system 130 by comparing the received operational control data to press identification data provided to controller 132, and then generating the appropriate control commands in accordance with the authorization determination. Additionally, input control signal 136 may include instructions indicating that monitoring system 130 is to be activated for only a certain period of time, such as months or years. Furthermore, input control signal 136 may include instructions which provide that monitoring system 130 obtain only a certain number of measurement readings. For this purpose, monitoring system 130 may optionally include a counting apparatus such as an accumulator circuit (not shown) which is coupled to acceleration sensor 52 to provide a continuous count of the number of acceleration measurements being made. Controller 132 would then monitor and control the operation of the acceleration sensor 52 in accordance with a comparison of the measurement readings limit data and the measurement readings count data. A control line (not shown) would connect controller 132 to acceleration sensor 52 for this purpose. It should be apparent that controller 132 may be connected to any one of the indicated units to effect individual control thereof.

Other locking means may be provided in conjunction with controller 132 to prevent use of the apparatus on unauthorized presses. One alternative structure may employ a bar code attached to a press to which the system and apparatus is authorized to be used therewith. The apparatus includes a bar code reader which reads a pre-attached bar code connected with the press and transmits it to controller 132. An internal timer on the system then permits use of the apparatus for a particular amount of time after the reading of the attached bar code. Additionally, the bar code itself may include information necessary for use of the device, along with providing a means to inform the apparatus either that the press (1) may be used with the monitoring system or (2) has been designated as a machine for which generated measurement data may be saved. In this way, a data set of information may be created which is linked to the unique bar codes for the individual presses, allowing accurate retrieval of the information at a later date.

Another type of locking means involves a count-down timer. One such timer mechanism incorporated in the monitoring system could be set to a number of different time intervals, so as to permit the system to be used for one month, three months, one year, or any other selected period. The timer mechanism may also be provided in the form of a measurement counter to permit a predetermined number of readings or uses until such time as the limit is reached and the system operation is then disabled. Such a count-down timer may comprise a chip-based memory, decrement counter, or other types of hardware or software encoded counter or timer. An additional feature of the present invention is that such timer or counter mechanism may be reset or changed via an input code, a scan bar code, or even communication through a telephone or wireless communication link. For this purpose, the evaluation selector device 138 may be provided in the form suitable to the chosen implementation.

In accordance with another aspect of the present invention, monitoring system 130 includes an evaluation selector device 138 (e.g., an electronic or manual input module) for generating a selection signal 140 that instructs controller 132 to perform monitoring activity with respect to a selective one of a compression phase and a tensile phase. For this purpose, monitoring system 130 further includes an operating mode indicator 142 that is responsive to the measurement data being provided by acceleration sensor 52 to determine the current operating mode of the machine (i.e., tensile or compressive) and to transmit to controller 132 a mode indicator signal representative thereof. For example, the operating mode can be determined in accordance with the direction of the applied force as indicated by the vector part of the acceleration measurement; namely, a downward force produces compression while an upward force produces tensile effects. Controller 132 would then selectively enable or disable monitoring system 130 depending upon an evaluation of the operating mode indicator signal in view of the selected operating phase represented in selection signal 140.

In accordance with another aspect of the present invention, monitoring system 130 may be optionally provided with a storage archive facility 144 to collect and store the following information: acceleration measurement data 82 generated by acceleration sensor 52, peak acceleration measurement data 86 generated by peak signal detection circuit 84, and/or peak load measurement data 88 generated by signal processor 56. The information stored in storage archive 144 is preferably correlated to and/or indexed in accordance with a variety of characterizing indices, such as type of die application, type of operating phase (compressive or tensile), type of press machine, date, time, and other such identifying attributes. The user may then select which recorded measurement data to have evaluated by submitting a request to controller 132 via evaluation selector device 138. This request would include all of the identifying parameters needed to retrieve the proper measurement data from storage archive 144. Controller 132 would retrieve the appropriate measurement data from storage archive 144 using storage access control signal 146 generated in accordance with the user-provided data request. In response, storage archive 144 would transmit the requested information to processor 89 as monitoring request signal 148 to initiate evaluation thereof. The user, for example, may use this selective monitoring feature to first cycle through an evaluation sequence involving the compressive-type forces and then request a similar evaluation of the tensile-type forces at a later time.

In accordance with another aspect of the present invention, the results of the peak load level evaluation performed by evaluation unit 68 is provided to a series of output or interface modules to enable the information generated by the monitoring activity to be made available over different distribution channels. For example, a communications device 150 can be used to transmit the monitoring activity information to remote sites over a networking connection. Additionally, a text/speech module 152 can be used in conjunction with an alert detection mechanism 154 to inform personnel of the occurrence of certain adverse operating conditions, e.g., out-of-bounds peak operating levels.

The functional units described above to perform the analysis and processing functions are preferably implemented with microprocessor technology, although it should be understood that any other suitable hardware or software implementation is possible within the scope of the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly for use in monitoring the operation of a press machine, comprising:

data means for providing load level capacity data associated with said press machine;

measurement means for providing a measure of the acceleration activity present within said press machine, wherein said acceleration activity measurement being representative of a load level measurement; and evaluation means for comparing said load level measurement with said load level capacity data and for providing an indication of an operating condition of said press machine based upon said comparison.

2. The assembly as recited in claim 1, wherein said data means further comprises:

means for providing operating zone data defining a plurality of press machine operating zones each representing a corresponding range of load values.

3. The assembly as recited in claim 2, wherein said evaluation means further comprises:

processing means for evaluating said load level measurement in relation to said operating zone data to determine which ones of said plurality of press machine operating zones encompass said load level measurement.

4. The assembly as recited in claim 3, wherein said evaluation means further comprises:

means for providing each respective one of said press machine operating zones with a respective rating factor indicating the relationship of said respective one press machine operating zone to at least one of a threshold compressive load level and a threshold tensile load level; and means for determining the operating condition of said press machine in accordance with the acceleration activity measurement provided by said measurement means and the respective rating factors associated with the respective press machine operating zones determined by said processing means to encompass the load level measurement represented by said acceleration activity measurement.

5. The assembly as recited in claim 2, wherein said measurement means further comprises:

peak detector means for generating at least one peak acceleration signal each representing a respective peak load level developed within said press machine.

6. The assembly as recited in claim 5, wherein said evaluation means further comprises:

processing means for evaluating the at least one peak load level generated by said peak detector means in relation to said operating zone data to determine which respective one of said plurality of press machine operating zones encompasses each respective one of the at least one peak load level.

7. The assembly as recited in claim 6, wherein said evaluation means further comprises:

means for determining the operating condition of said press machine in accordance with at least one of said at least one peak acceleration signal and the respective press machine operating zone determined by said processing means to encompass the respective peak load level represented by the at least one of said at least one peak acceleration signal.

8. The assembly as recited in claim 1, wherein said load level capacity data includes a representation of a maximum allowable compressive load level and/or a representation of a maximum allowable tensile load level.

9. The assembly as recited in claim 1, wherein the monitoring of said press machine operation by said assembly is performed dynamically over at least one press operating cycle.

10. The assembly as recited in claim 1, further comprises:

display means for displaying the indication of an operating condition of said press machine as provided by said evaluation means.

11. The assembly as recited in claim 1, wherein said measurement means and said evaluation means are arranged to form a portable instrument unit.

12. The assembly as recited in claim 1, wherein said measurement means further comprises:

an accelerometer.

13. The assembly as recited in claim 1, wherein said evaluation means further comprises:

analysis means, responsive to a plurality of acceleration values provided by said measurement means during a corresponding press cycle interval, for identifying ones of said plurality of acceleration values meeting a selectable signal characteristic criteria to thereby define a selected acceleration signal group, comparing the respective operating load level represented by each respective one of said selected acceleration signal group with said load level capacity data, and providing an indication of an operating condition of said press machine in accordance with said comparison performed by said analysis means.

14. The assembly as recited in claim 13, wherein the selectable signal characteristic criteria represents a peak acceleration condition.

15. The assembly as recited in claim 1, further comprises:

control means arranged to selectively activate at least one of said measurement means and said evaluation means only when the press machine designated for monitoring satisfies an authorization condition.

16. The assembly as recited in claim 15, wherein the authorization condition is satisfied when the press machine designated for monitoring corresponds to at least one of an authorized press machine, an authorized family of press machines, and a press machine from an authorized manufacturer.

17. The assembly as recited in claim 1, further comprises:

selection means responsive to a control signal for selectively activating said evaluation means in accordance with said control signal to thereby enable operation of said evaluation means during a selective one of press machine compression activity and press machine tensile activity.

18. The assembly as recited in claim 17, further comprises:

means, responsive to the acceleration activity measurement provided by said measurement means, for determining whether said acceleration measurement corresponds to a one of compression activity and tensile activity and for generating a signal based upon this determination to control said selection means.

19. The assembly as recited in claim 1, wherein said measurement means operates dynamically to generate a plurality of acceleration measurements.

20. The assembly as recited in claim 19, further comprises:
recordation means for recording the respective operating load level corresponding to each respective one of said plurality of acceleration measurements generated by said measurement means; and
retrieval means for controllably accessing and retrieving from said recordation means selectable ones of said recorded operating load levels corresponding to a selective one of press machine compression activity and press machine tensile activity and applying the selected ones of said recorded operating load levels to said evaluation means for comparison with said load level capacity data.

21. The assembly as recited in claim 1, further comprises:
annunciator means, responsive to the occurrence of an out-of-bounds operating load level condition as indicated by the load level comparison result generated by said evaluation means, for providing an indication of the occurrence of said out-of-bounds operating load level condition.

22. The assembly as recited in claim 1, further comprises:
timer means for selectively activating at least one of said measurement means and said evaluation means to enable respective operation thereof over a selectable time period.

23. The assembly as recited in claim 1, further comprises:
means for selectively controlling the operation of said measurement means to make a selectable number of acceleration measurements.

24. A system for use with a press machine, comprising:
data means for providing load level capacity data associated with said press machine;
a sensor assembly operatively arranged to dynamically measure the acceleration activity occurring within said press machine to thereby generate a plurality of acceleration signals representing a corresponding plurality of load level values; and
processor means, responsive to said plurality of acceleration signals generated by said sensor assembly, for determining an operating state of said press machine based at least in part upon a comparison between said load level capacity data and at least one of said plurality of load level values.

25. The system as recited in claim 24, wherein said processor means determines the operating state of said press machine by identifying ones of said plurality of acceleration signals each representing a respective peak acceleration condition to thereby define a peak acceleration signal group, comparing the corresponding load level value for each respective one of said peak acceleration signal group with said load level capacity data to thereby generate a peak level comparison result, and providing an indication of the operating state of said press machine in accordance with said peak level comparison result.

26. The system as recited in claim 25, wherein said data means further comprises:
means for defining a plurality of press machine operating zones each representing a corresponding range of load values;
wherein said processor means provides said indication of the operating state of said press machine in accordance with a determination of which respective one of said plurality of press machine operating zones encompasses each respective one of said peak acceleration signal group.

27. The system as recited in claim 26, wherein said load level capacity data includes a representation of a maximum allowable compressive load level and/or a representation of a maximum allowable tensile load level.

28. A system for use in monitoring the operation of a press machine, comprising:
data means for providing load level capacity data associated with said press machine;
measurement means for providing a measure of the peak load levels developed within said press machine; and
evaluation means for determining an operating state of said press machine based at least in part upon a comparison between said peak load levels measurement provided by said measurement means and said load level capacity data.

29. The system as recited in claim 28, wherein said measurement means comprises:
an accelerometer.

30. The system as recited in claim 28, wherein said data means further comprises:
means for defining a plurality of press machine operating zones each representing a corresponding range of load values;
wherein said evaluation means determines the operating state of said press machine in accordance with a determination of which respective one of said plurality of press machine operating zones encompasses each respective one of the measured peak load levels provided by said measurement means.

31. The system as recited in claim 30, wherein said measurement means further comprises:
signal means for generating at least one peak acceleration signal each representing a respective peak load level within said press machine.

32. The system as recited in claim 31, wherein said plurality of press machine operating zones being defined in relation to at least one of a maximum allowable compressive load level and a maximum allowable tensile load level.

33. A method of monitoring the operation of a press machine, comprising the steps of:
providing a measure of the load level being developed within said press machine;
providing capacity data indicating load level capacity values for said press machine; and
evaluating the operation of said press machine by comparing said load level measurement with said capacity data.

34. The method as recited in claim 33, wherein the step of providing said load level measurement further comprises the step of:
generating a plurality of acceleration signals representative of the acceleration activity occurring within said press machine.

35. The method as recited in claim 34, wherein said step of providing capacity data further comprises the step of:
defining a plurality of press machine operating zones each representing a corresponding range of load values.

36. The method as recited in claim 35, wherein said evaluation step further comprises the steps of:
- identifying which ones of said generated plurality of acceleration signals represent the occurrence of a respective peak acceleration condition to thereby define a peak acceleration signal group;
- determining which respective one of said plurality of press machine operating zones encompasses each respective one of said peak acceleration signal group; and
- determining an operating state for said press machine in accordance with the respective press machine operating zone determined to encompass each respective one of said peak acceleration signal group.

37. The method as recited in claim 36, wherein said plurality of press machine operating zones being defined in relation to at least one of a maximum allowable compressive load level and a maximum allowable tensile load level.

38. A method of monitoring the operation of a press machine, comprising the steps of:
- providing a measure of the peak load levels developed within said press machine;
- providing capacity data indicating load level capacity values for said press machine; and
- evaluating the operation of said press machine by comparing said peak load levels measurement with said capacity data.

39. The method as recited in claim 38, wherein the step of providing a measure of the peak load levels further comprises the step of:
- generating at least one peak acceleration signal each representing a respective peak load level within said press machine.

40. The method as recited in claim 39, wherein the step of providing capacity data further comprises the step of:
- defining a plurality of press machine operating zones each representing a corresponding range of load values.

41. The method as recited in claim 40, wherein said evaluation step further comprises the steps of:
- determining which respective one of said plurality of press machine operating zones encompasses each respective one of said at least one peak acceleration signal; and
- determining an operating state for said press machine in accordance with the respective press machine operating zone determined to encompass each respective one of said at least one peak acceleration signal.

42. The method as recited in claim 41, wherein said plurality of press machine operating zones being defined in relation to at least one of a maximum allowable compressive load level and a maximum allowable tensile load level.

* * * * *